United States Patent [19]

Murao et al.

[11] 3,856,938

[45] Dec. 24, 1974

[54] ANTIBIOTIC EM-49

[76] Inventors: Sawao Murao, 8-12, 2-Cho Horiage-Midori Machi, Osaka, Japan; Edward Meyers, 4 Plymouth Ln., East Brunswick, N.J. 08816; William Lawrence Parker, 1410 Oak Tree Dr., Apt. E, North Brunswick, N.J. 08902

[22] Filed: Apr. 7, 1972

[21] Appl. No.: 242,047

Related U.S. Application Data

[63] Continuation-in-part of Ser. No. 137,894, April 27, 1971, abandoned.

[52] U.S. Cl................. 424/116, 424/118, 424/119, 195/80
[51] Int. Cl........................................... A61k 21/00
[58] Field of Search ....... 424/116, 118, 119; 195/80

[56] References Cited
OTHER PUBLICATIONS

Miller, The Pfizer Handbook of Microbial Metabolites 1961, McGraw-Hill Book Co., Inc., N.Y., N.Y. page 371.

Primary Examiner—Jerome D. Goldberg
Attorney, Agent, or Firm—Lawrence S. Levinson

[57] ABSTRACT

The antibiotic EM-49 is obtained by the cultivation under controlled conditions of Bacillus circulans ATCC 21656. It is active against gram-positive and gram-negative bacteria and fungi like Candida albicans.

10 Claims, 9 Drawing Figures

INFRARED SPECTRUM OF ANTIBIOTIC EM-49 HCl

NMR SPECTRUM OF ANTIBIOTIC EM-49 HCl

INFRARED SPECTRUM OF ANTIBIOTIC EM-49

NMR SPECTRUM OF ANTIBIOTIC EM-49

INFRARED SPECTRUM OF ANTIBIOTIC EM-49 ALPHA

INFRARED SPECTRUM OF ANTIBIOTIC EM-49 BETA

INFRARED SPECTRUM OF ANTIBIOTIC EM-49 GAMMA

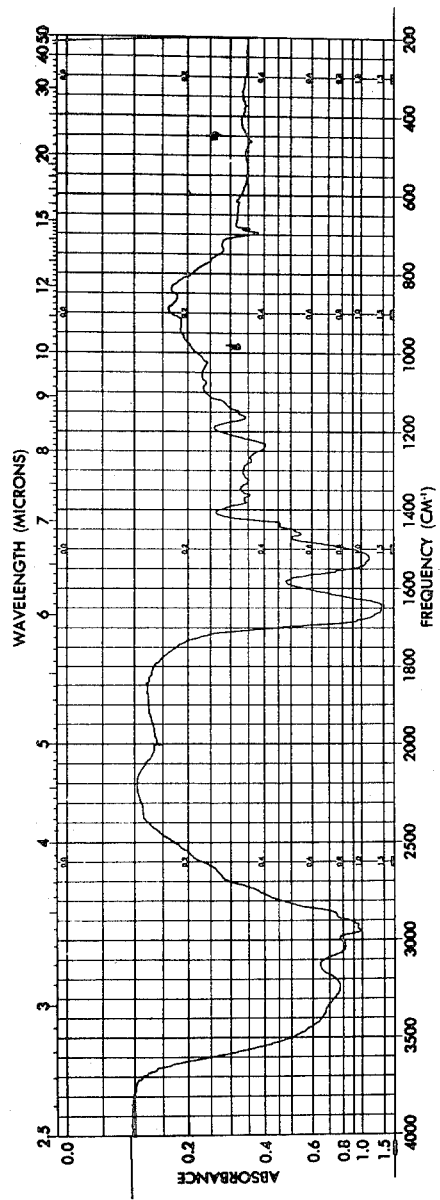

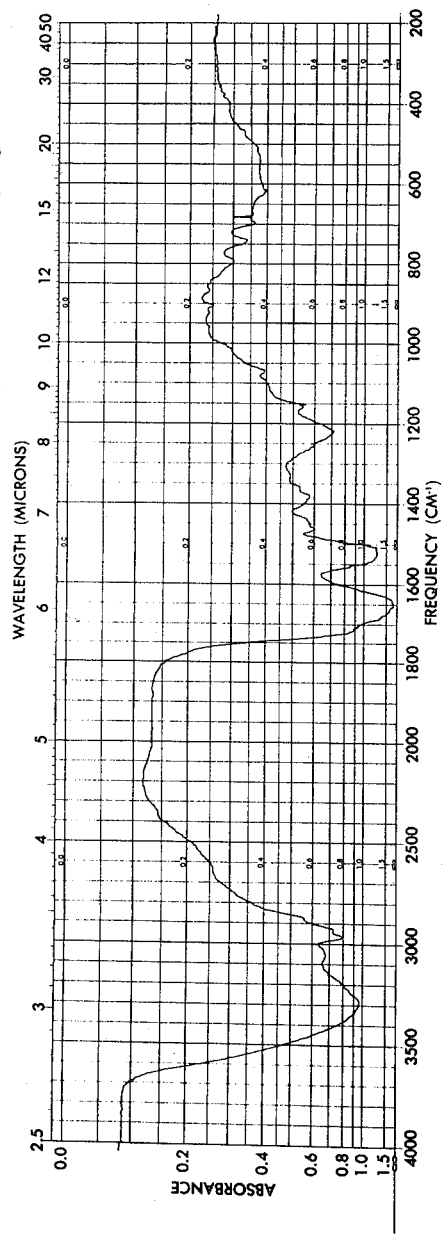

ANTIBIOTIC EM-49

This application is a continuation-in-part of application Ser. No. 137,894, filed Apr. 27, 1971, now abandoned.

SUMMARY OF THE INVENTION

This invention relates to a new antibiotic, designated EM-49, and to a method for its production, as well as for separating it into component parts. The antibiotic is obtained by cultivating the microorganism *Bacillus circulans* ATCC 21656 in an aqueous nutrient medium comprising an assimilable carbohydrate and an assimilable nitrogen source under submerged aerobic conditions until substantial antibiotic activity is imparted to the medium.

The fermentation broth is acidified, the solids are separated by filtration, washed with water and the water washings are added to the filtrate. The combined washings and filtrate are extracted with a water immiscible alcohol, preferably n-butanol. The alcoholic solution is concentrated and the antibiotic is precipitated with an organic solvent, e.g., ethyl acetate, acetonitrile, ether or preferably with acetone. The product may be further purified by counter-current distribution in a water-alcohol-organic acid system, e.g., n-propanol-n-butanol-water-acetic acid or by formation of the helianthate salt and regeneration of the antibiotic from this salt.

These procedures result in the isolation of the product antibiotic, designated EM-49, as the acid salt corresponding to the acid used for acidification of the broth. The salt may be converted to the free base by neutralization with a base like ammonium hydroxide, sodium hydroxide, barium hydroxide, or the like, and extraction with a water immiscible alcohol like n-butanol.

The antibiotic EM-49, obtained in this manner is an antimicrobially active substance which has the activity described below. By more refined separation techniques, as further described, this may be separated into four fractions containing active materials closely related structurally and a fifth active fraction containing an active material not as closely identified structurally.

FIG. 8 shows the infrared spectrum of antibiotic EM-49 delta in KBr.

FIG. 9 shows the infrared spectrum of antibiotic EM-49 SMF in KBr.

Figure 1:
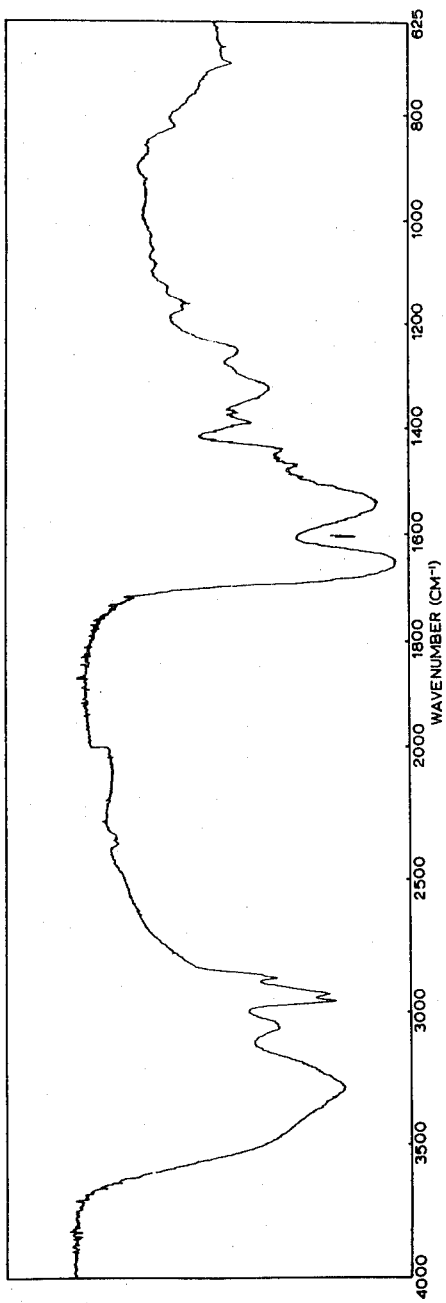
FIG. 1 shows the infrared spectrum of antibiotic EM-49, as the hydrochloride, in KBr.

The antibiotic EM-49 and the fractions obtained therefrom are active against fungi and gram-negative and gram-positive bacteria, e.g., *Staphylococcus aureus*, *Streptococcus pyogenes*, *Escherichia coli*, *Pseudomonas aeruginosa* and *Candida albicans*. The antibiotic or a physiologically acceptable salt thereof may therefore be used as an antimicrobial agent either as an environmental disinfectant, e.g., in a spray or dust containing up to about 1% of the substance in a conventional carrier, or to combat infections in various animal species due to microorganisms such as those enumerated, e.g., topically in a conventional cream or ointment containing up to about 1% of the substance or in an injectable dosage form at about 50 to 125 mg./kg./day. The $ED_{50}$ in mice against a lethal systemic *Escherichia coli* infection, for example, is approximately 50 mg./kg.

DETAILED DESCRIPTION OF THE INVENTION

The Microorganism

The microorganism useful for the production of EM-49 is a strain of *Bacillus circulans* isolated from the soil. A subculture of the organism may be obtained from the permanent collection of the American Type Culture Collection, Rockville, Md. Its accession number in this repository in ATCC 21656.

The characteristics of *Bacillus circulans* ATCC 21656 are:

Microscopic: Spore forming bacillus which is gram variable to gram negative. Spores are central to subcentral, oval; the spore wall is thick and readily stained; sporangium is definitely swollen. Rods are not in chains. Smears stained with 0.5% basic fuchsin show faint encapsulation.

Macroscopic: Colonies on glucose-nutrient agar are glistening with smooth to lobate edges. Colonies are adherent, very mucilaginous; motile, spreading rapidly over the surface of the agar, particularly if the plates are moist.

In nutrient broth, turbidity is fair with a heavy sediment. A thick mucilaginous pellicle forms, literally sealing the broth culture.

Physiological Characters: Voges-Proskauer test for production of acetylmethylcarbinol is negative. Indole production is negative. Starch is strongly hydrolyzed as is casein. Gas is not formed from carbohydrates, although the organism grows and produces acid on inorganic media with glucose, sucrose or xylose as sole carbon sources. There is no growth at 60°–65°C.

Production of the Antibiotic

*Bacillus circulans* ATCC 21656 produces an antibiotic that possesses activity against gram-positive and gram-negative bacteria and fungi like *Candida albicans*. To form the antibiotic, according to the preferred modification, *Bacillus circulans* ATCC 21656 is grown at about 25°C under submerged aerobic conditions in an aqueous nutrient medium containing an assimilable carbohydrate and nitrogen source. The fermentation is carried out for approximately 60 to 150 hours, preferably about 144 hours, at the end of which time the antibiotic has been formed.

After the fermentation is completed, the beer is adjusted to pH 2 with an acid such as concentrated hydrochloric acid. Filter aid is added to the acidified fermentation beer, and the whole suspension is filtered. The solids are liberally washed with water, and the washings are then pooled with the filtrate. The washed solids are discarded. The filtrate plus added washings are extracted with water-saturated n-butanol. The butanol extract is concentrated in vacuo, at a temperature below 45°C, to a small volume. The concentrate is then diluted with 15 volumes of acetone. The precipitate thus obtained is washed with acetone, ethyl acetate and ether to give, after drying, a light-tan powder. The antibiotic in this crude preparation is further purified by counter-current distribution using n-propanol-n-butanol-water-acetic acid (50:75:100:2, by volume). Material obtained in a 29 transfer counter-current distribution is used for characterization of the antibiotic.

EM–49 is a basic peptide and forms salts with various inorganic and organic acids. Since the preferred procedure involves acidification of the fermentation broth with acid, the antibiotic is obtained in the form of the acid salt. When the fermentation broth is acidified with hydrochloric acid, the hydrochloride is obtained. If other acids, e.g., other mineral acids like hydrobromic acid, sulfuric acid, etc., are used, the corresponding acid salt may be obtained. The salt form in which the antibiotic is first obtained may be neutralized with a base such as sodium hydroxide to obtain the free base and, if desired, the latter may be converted to other acid salts by treatment with acetic acid, propionic acid, or other organic acid, or phosphoric acid or the like. Water insoluble salts, e.g., of arylsulfonic acids like 2-naphthalenesulfonic acid, methyl orange, p-phenylazobenzenesulfonic acid and the like, may be formed by reacting an acid salt of EM–49 like the hydrochloride with an alkali metal salt of the arylsulfonic acid.

A particularly preferred method for isolating antibiotic EM–49 is by means of the helianthate salt. The light tan powder obtained by precipitation with acetone from the concentrate, referred to above, is treated with an aqueous solution of methyl orange resulting in the precipitation of the helianthate salt of EM– 49. The helianthate is amorphous at this stage and is purified by reprecipitation from dimethylformamide, methanol-acetonitrile or the like. Treatment with hydrochloric acid will reconvert the helianthate to the hydrochloride.

The light tan, acetone insoluble powder referred to above, contains the antibiotic EM–49. This material may be purified as described and used in this purified form. The purified powder contains closely related peptide antibiotics which, as an alternative, may be separated by ion exchange chromatography. All are characterized by the presence of four free amino groups.

When an aqueous solution of EM–49 hydrochloride, obtained via the helianthate salt described above, is chromatographed on a column of carboxymethylcellulose, sodium form (e.g., Whatman cellulose CM–52), and eluted with dilute sodium chloride solution, the antibiotic is resolved into four fractions as monitored by surface tension of the effluent. These fractions are respectively designated EM–49 alpha, EM–49 beta, EM–49 gamma and EM–49 delta in order of their elution. The several fractions are distinguishable by their amino acid composition and variations in the structure of fatty acid moieties. Amino acid analyses indicate that EM–49 alpha and beta contain no phenylalanine, five residues of 2,4-diaminobutyric acid and three residues of leucine. EM–49 gamma and delta contain one residue of phenylalanine, two residues of leucine and five residues of 2,4-diaminobutyric acid. EM–49 alpha and beta differ from each other in the structures of the fatty acids released on acid hydrolysis. EM–49 gamma and delta differ from each other in the same way.

Partition chromatography of the acetone-insoluble powder in certain systems reveals, in addition to EM–49, a slow moving fraction (SMF) that also has broad-spectrum antimicrobial activity. This fraction is isolated and purified by extraction with n-butanol followed by chromatography on diethylaminoethyl cellulose and repeated partition chromatography on a silicic acid-cellulose column eluting with n-butanol-isobutyric acid-pyridine-water (40–9–4–10). Alternatively, the antibiotic EM–49 SMF can be isolated and purified by chromatography of the acetone-insoluble powder on Sephadex LH20 (an alkylated, cross-linked dextran), eluting with methanol. The SMF is readily isolated through formation of the crystalline reineckate salt which is obtained as a purple crystalline solid.

The invention may be further illustrated by the following examples:

EXAMPLE 1

Yeast beef agar slants are seeded with *Bacillus circulans* ATCC 21656. They are incubated overnight at 37°C and then used to inoculate 50 ml. of an aqueous soybean meal medium contained in 250 ml. Erlenmeyer flasks. The composition of the germination medium is:

| Medium | Grams |
| --- | --- |
| Soybean meal | 15.0 |
| Dehydrated mashed potato | 15.0 |
| Glucose | 50.0 |
| $CoCl_2.2H_2O$ | 0.005 |
| $CaCO_3$ | 10.0 |
| Distilled water to | 1 liter |

This medium is sterilized for 30 minutes at 121°C and at 15 lbs. steam pressure prior to use. The inoculated germination flasks are incubated at 25°C for 72 hours on a rotary shaker, operating at 280 r.p.m. with a 2 inch throw.

A 2.5% (v/v) transfer is made from the germination flask to 500 ml. Erlenmeyer flasks containing 100 ml. of an aqueous corn steep liquor medium. The composition of this medium is:

| Medium | Grams |
| --- | --- |
| Corn steep liquor | 6.0 |
| $(NH_4)H_2PO_4$ | 3.0 |
| Yeast extract | 2.5 |
| Dextrose | 10.0 |
| Distilled water to | 1 liter |
| Adjust pH to 7.0 | |
| $CaCO_3$ | 2.5 |

The fermentation flasks are incubated and agitated as are the germination flasks. Samples are taken at 3 and 6 days, and examined by paper chromatography and bioassay. For paper chromatography suitable amounts of a butanol extract of the acidified beer are spotted on sheets of Whatman No. 1 paper and the chromatograms developed with a solvent of the following composition: n-butanol, acetic acid, water (4:1:5, by volume). The upper phase of this solvent system is utilized as the solvent. In this system, EM–49 (as the hydrochloride) has an $R_f$ value of 0.71. The antibiotic is detected by bioautography against *Staphylococcus aureus*

FDA 209P and *Escherichia coli* ATCC 10536. For bioassay, both organisms are used in conventional tube dilution assays.

EXAMPLE 2

A 250 liter batch of *Bacillus circulans* ATCC 21656 is fermented in a 100 gal. stainless steel vessel with the medium and operating conditions described below:

Stage 1

Inoculum: Culture of *Bacillus circulans* ATCC 21656 is preserved by storage in liquid nitrogen, and grown out when needed on yeast beef agar slants that have the following composition:

| Medium | Grams |
| --- | --- |
| Beef extract | 1.5 |
| Yeast extract | 3.0 |
| Peptone | 6.0 |
| Dextrose | 1.0 |
| Agar | 15.0 |
| Distilled water to | 1,000 ml. |

The medium is sterilized at 15 lbs. pressure and at 121°C for 15 minutes prior to use.

Growth from the slant is used to inoculate the first germinator flasks.

| Medium | Grams |
| --- | --- |
| Soybean meal | 15.0 |
| Dehydrated mashed potato | 15.0 |
| Glucose | 50.0 |
| $CoCl_2 \cdot 2H_2O$ | 0.005 |
| $CaCO_3$ | 10.0 |
| Distilled water to | 1000 ml. |
| Sterilize at 121°C for thirty minutes | |

Sterilize at 121°C for thirty minutes
100 ml. of this medium in a 500 ml. Erlenmeyer flask is incubated 72 hours on a rotary shaker at 25°C. The shaker operates at 280 r.p.m. with a 2 inch throw.

Stage 2

Inoculum: 100 ml. from first stage.
Medium: Same as the germinator medium of stage 1.

The inoculum and 1,000 ml. of medium in a 4,000 ml. Erlenmeyer flask is incubated 72 hours at 25°C. on a rotary shaker. The shaker is operated at 280 r.p.m. with a 2 inch throw.

Stage 3
Inoculum: 3,000 ml. from stage 2.
Medium:

| Medium | Grams |
| --- | --- |
| Corn steep liquor | 6.0 |
| $(NH_4)H_2PO_4$ | 3.0 |
| Yeast Extract | 2.5 |
| Dextrose | 10.0 |
| Distilled water to 1,000 ml. | |
| Adjust to pH 7.0 | |
| $CaCO_3$ | 2.5 |

The inoculum is added to 250 liters of medium and incubated 144 hours. During incubation, the broth is aerated at the rate of 2.0 foot per minute superficial air velocity, at 10 p.s.i. During this period, the broth is agitated at the rate of 0.4 watt per liter and at 155 r.p.m.

EXAMPLE 3

The fermentation broth, obtained as described in Example 2 (209 liters), is adjusted to pH 2.0 with 1.5 liters of concentrated hydrochloric acid. Filter aid (Hyflo, 15 kg.) is added to the acidified beer and the mixture filtered to give 41 kg. of insoluble material. The insoluble cake is washed with 10 liters of water and the washings combined with the filtrate to give 190 liters. The washed cake (41 kg.) is discarded.

EXAMPLE 4

The filtrate (190 liters) obtained in Example 3 is extracted three times with 56 liter portions of water saturated n-butanol. The butanol layers (194 liters) are pooled and concentrated in vacuo, at a temperature less than 45°C., to a small volume (2.3 liters).

EXAMPLE 5

A 50 ml. portion of the concentrate obtained in Example 4 is diluted with 750 ml. of acetone and the resulting precipitate is centrifuged. The precipitate is washed with acetone (60 ml.) by suspending it in the solvent and then centrifuging it. This is repeated using ethyl acetate (three 60-ml portions) and finally ether (three 60-ml portions). The precipitate is dried in air, powdered and dried in vacuo, giving 1.4 g. of a light-tan powder.

EXAMPLE 6

A 1.4 g. sample of the acetone-insoluble powder obtained in Example 5 is further purified by countercurrent distribution using a n-propanol-n-butanol-water-acetic acid (50:75:100:2 by volume) system. Twenty-nine transfers are made using 40 ml. of each phase per tube. The maximum activity, as determined by paper disc agar diffusion assay, is in tube 11. The contents of tubes 8–14 are combined and the solvents are removed in vacuo. The residue is dissolved in a little methanol and the antibiotic is precipitated by the addition of acetone and ether. The precipitate is washed well with ether, dried in air and then in vacuo, giving 0.466 g. of a light-tan powder. This material is primarily the basic peptide antibiotic EM-49, in the form of its hydrochloride salt. No circulin has been detected in the broths produced under these conditions.

| Analysis | | Optical Rotation c=1.0 in water | |
| --- | --- | --- | --- |
| C, | 45.58 | 589 nm | −42±3° |
| H, | 7.31 | 578 | −44 |
| N, | 14.42 | 546 | −50 |
| Cl, | 11.86 (ionic) | 436 | −91 |

Figure 2:
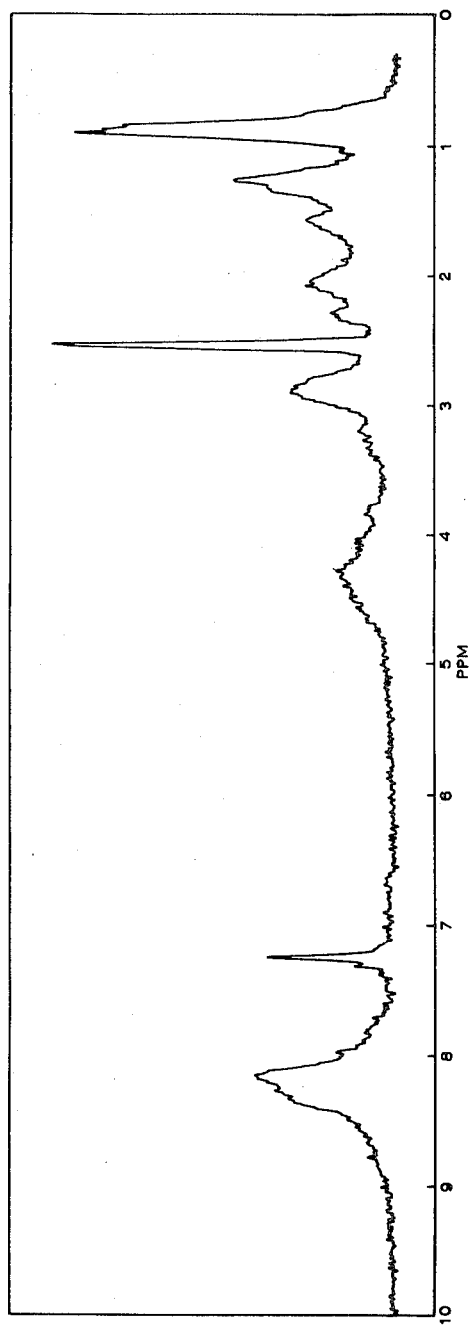
FIG. 2 shows the 100 MHZ nuclear magnetic resonance spectrum of antibiotic EM-49, as the hydrochloride, in dimethylsulfoxide-$d_6$.

The infrared spectrum, as the hydrochloride, in KBr is shown in FIG. 1. The 100 MHz nuclear magnetic resonance spectrum, as the hydrochloride, in dimethylsulfoxide-$d_6$ is shown in FIG. 2.

Paper chromatography on Whatman No. 1 filter paper using bioautography against *E. coli* ATCC 10536 is used to detect the antibiotic.

| Solvent System (by volume) | $R_f$ |
| --- | --- |
| n-Butanol-acetic acid-water (4:1:5) | 0.71 |
| n-Propanol-n-butanol-water (2:3:4) | 0.57 |
| Chloroform-methanol-water (5:4:3) | 0.38 |
| Chloroform-methanol-1% acetic acid (5:4:2) | 0.35 |
| Chloroform-methanol-0.5N NH$_4$OH (5:4:2) | 0.91 |

The hydrochloride of antibiotic EM–49 melts at 180°–207°C. (dec.) in vacuo. It is soluble in water, methanol, ethanol, dimethylsulfoxide and acetic acid and is insoluble in acetone, ethyl acetate, ether and acetonitrile.

A hydrolysate from a sample (2.30 mg.) of antibiotic EM–49 hydrochloride, as produced according to the foregoing procedure, obtained by heating it in 6N HCl at 110°C. for 16 hours and analyzed by the conventional Stein-Moore method shows the presence of leucine (3.95 micromoles) and 2,4-diaminobutyric acid (7.35 micromoles). Phenylalanine (0.86 micromoles) is also detected in the hydrolysate. Only trace quantities of other amino acids are detected. There is a lack of an identifiable amount of the amino acid threonine and this serves to distinguish antibiotic EM–49 from other peptide antibiotics like circulin, the polymyxins and polypeptin. An as yet unidentified fatty acid is obtained from the hydrolysate by extraction with ether, indicating the presence of approximately 10% by weight of this acid in the antibiotic. The UV spectrum of the hydrochloride taken in 0.05 N HCl, has a weak maximum at 248 nm ($E^{1\%}$=25) and end absorption. The intensity of the absorptions at 248 nm is probably elevated by colored impurities that give tailing absorption out into the visible region. This peak and the end absorption are due, at least in part, to the phenylalanine component.

EXAMPLE 7

The hydrochloride of antibiotic EM–49 is converted to the free base by counter-current distribution using a n-butanol-0.5 N NH$_4$OH system. 1.01 g. of the hydrochloride of EM–49, prepared as in Example 6, is processed in a 29 transfer counter-current distribution using 40 ml. each of upper and lower phases per tube. The contents of tubes 25–29 are combined, and the upper phase is separated and taken to dryness in vacuo. The residue is then dissolved in warm methanol (ca 50 ml.). Ethyl acetate (50 ml.), benzene (50 ml.) and cyclohexane (50 ml.) are added. Removal of this solvent mixture in vacuo gives 0.75 g. of a nearly white powder that is the free base of the antibiotic EM–49. This material melts at 245°–248°C. in an evacuated capillary. Analysis: C, 56.64; H, 8.65; N, 16.50; Cl, 0.0

The molecular weight of the free base determined in ethanol by ultracentrifugation is approximately 1080. The equivalent weight by titration with perchloric acid is 272. The empirical formula of antibiotic EM–49 the free base corresponds approximately to $C_{51}H_{93}N_{13}O_{12}$.

The UV spectrum taken in methanol, has in addition to strong end absorption, the following peaks:

| λ max | $E^{1\%}$ |
| --- | --- |
| sh 247.5 | 5.8 |
| sh 252 | 4.5 |
| 258 | 4.1 |
| 265 | 3.4 |
| 268 | 3.2 |

Figure 3:
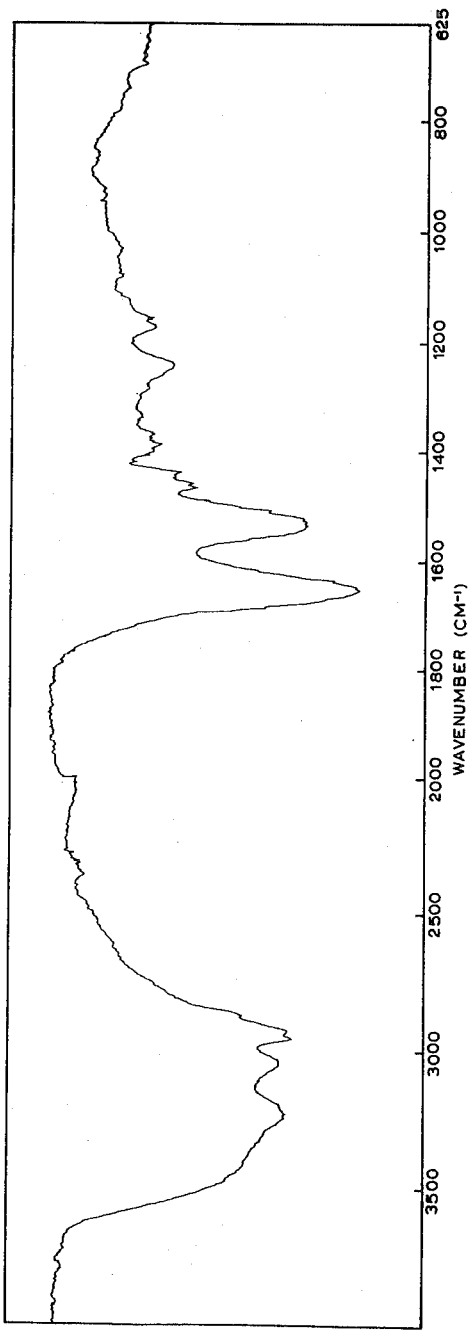
FIG. 3 shows the infrared spectrum of antibiotic EM-49 in KBr.
Figure 4:
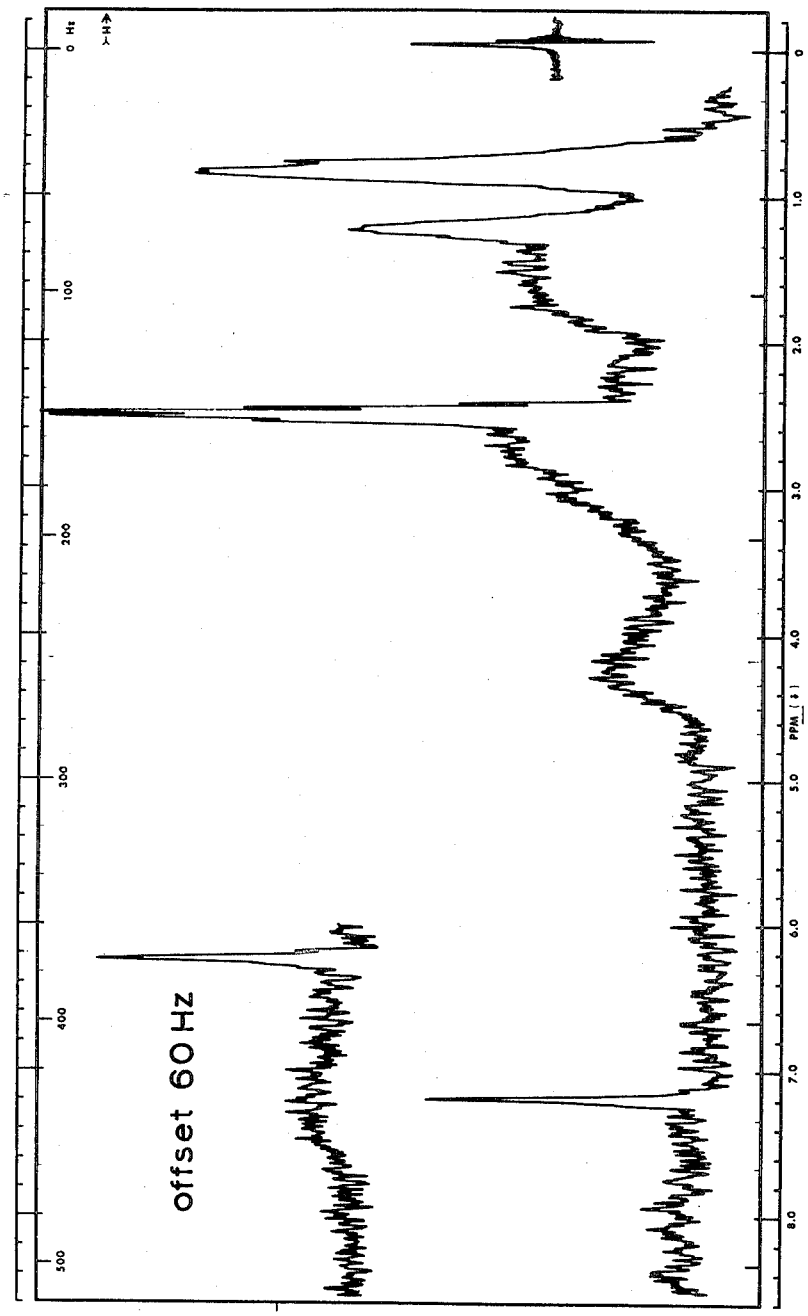
FIG. 4 shows the 60 MHz nuclear magnetic resonance spectrum of antibiotic EM-49 in dimethylsulfoxide-$d_6$.
Figure 5:
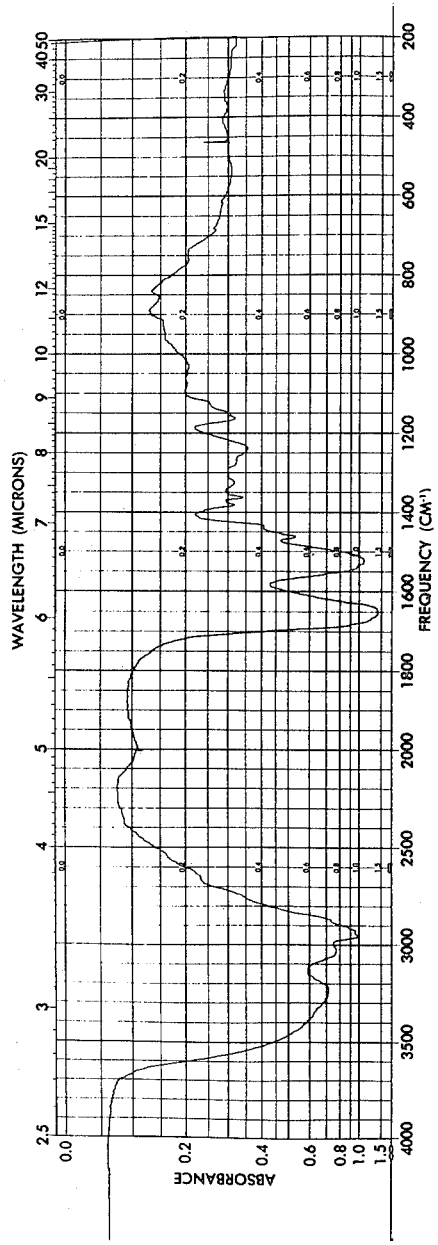
FIG. 5 shows the infrared spectrum of antibiotic EM-49 alpha in KBr.
Figure 6:
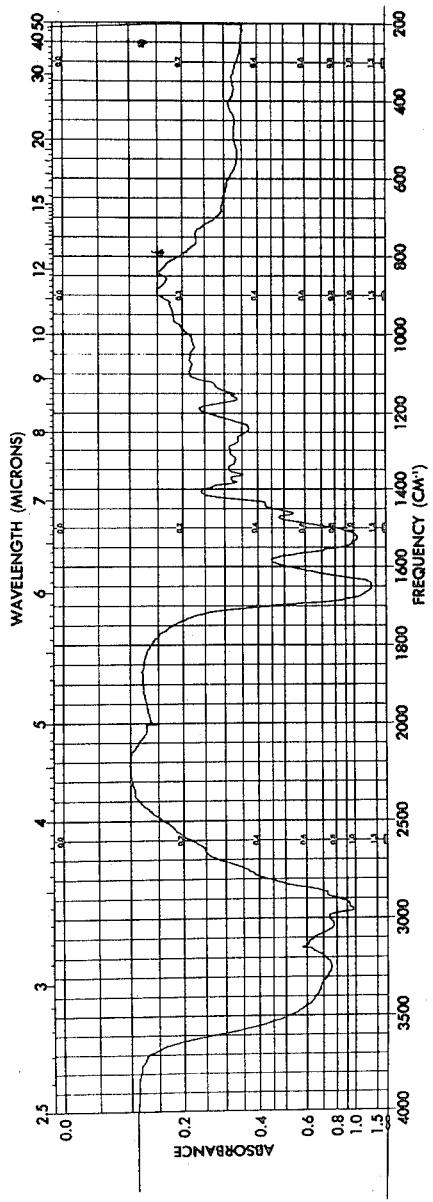
FIG. 6 shows the infrared spectrum of antibiotic EM-49 beta in KBr.
Figure 7:
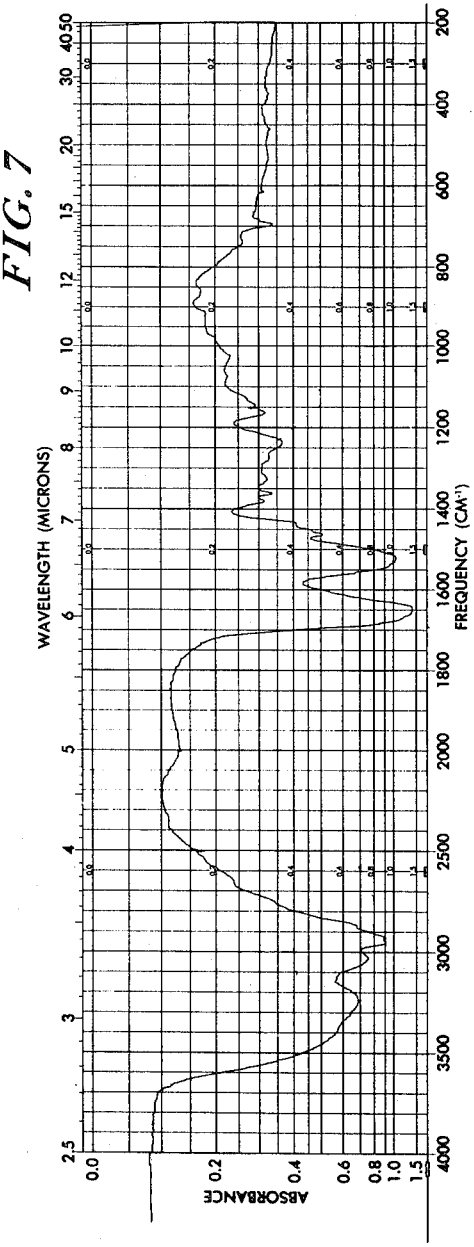
FIG. 7 shows the infrared spectrum of antibiotic EM-49 gamma in KBr.

The infrared spectrum in KBr is shown in FIG. 3. The 60 MHz nuclear magnetic resonance spectrum in dimethylsulfoxide-d$_6$ is shown in FIG. 4.

Solutions of antibiotic EM–49 hydrochloride in water (0.1 to 10 mg./ml.) are treated with sodium and potassium salt solutions (0.5 M). Salts of the following anions give no precipitate: OAc$^-$, H$_2$PO$_4^=$, I$^-$, ClO$_3^-$, C$_2$O$_4^=$, Br$^-$, B$_4$O$_7^=$, IO$_3^-$. The following anions give precipitates in descending order of solubility: SO$_4^=$, MoO$_4^=$, HPO$_4^=$, CrO$_4^=$, Fe(CN)$_6^{-4}$, Fe(CN)$_6^{-3}$, Cr$_2$O$_7^=$, WO$_4^=$.

EXAMPLE 8

Antibiotic EM–49 can also be precipitated from aqueous solution as the salt of various arylsulfonic acids by treatment with the acid or a salt of the acid. The following is illustrative: 1.00 g. of EM–49 hydrochloride is dissolved in 50 ml. of water and a solution of 1.25 g. of p-phenylazobenzenesulfonic acid in 20 ml. of water is added. The mixture is stirred for 0.5 hr. and allowed to settle. The supernatant is decanted and the precipitate washed twice by decantation with 30 ml. portions of water and a third time by filtration. The precipitate is dried in vacuo, giving 1.43 g. of amorphous solid. This solid p-phenylbenzenesulfonic acid salt crystallizes when mixed with methanol. A sample is recrystallized four times from methanol-acetonitrile (2:1) giving material that decomposes at ca. 267° when heated rapidly in vacuo. Material that had been dried for several hours at 0.02 mm and 100°C gains in weight by 4.17% when equilibrated with atmospheric moisture. Analysis: Found: C, 53.29; H, 6.42; N, 13.10; O, 21.33 by difference; S, 5.86.

For a molecular weight of 2103 (calculated in the basis of four sulfur atoms in the formula) the analysis corresponds to a formula of $C_{97}H_{130}N_{21}O_{24}S_4$.

EXAMPLE 9

A mixture of 30.8 mg. of EM–49 hydrochloride, 1 ml. of n-butanol, 1 ml. of methyl ethyl ketone, 0.2 ml. of a 1 M solution of 2,4-dinitrofluorobenzene in benzene and 2 ml. of 10% sodium bicarbonate solution is stirred at room temperature for 1.7 hr. The upper phase is separated and the lower phase is washed several times with ethyl acetate. The solvents are removed in vacuo from the combined upper phase and washings. The residue is dissolved as much as possible in methyl ethyl ketone and insoluble material is removed by centrifugation and discarded. The supernatant is taken to dryness in a nitrogen stream. The residue is dissolved in a little acetone and the product is precipitated by the addition of benzene. The solid 2,4-dinitrophenyl derivative is washed several times with benzene and is dried in vacuo, giving 35.1 mg. of yellow powder. Analytical thin layer chromatography on silica gel, eluting with methanolchloroform (1:9) gives one clean spot, $R_f$ 0.51.

The material is purified by preparative thin layer chromatograpahy using the same system. A yellow band having $R_f$ 0.52 - 0.68 is collected. The product is washed from the silica gel with acetone-methanol (1:1) and converted to a powder (30.4 mg.) by precipitation from an acetone solution with benzene. UV spectrum in methyl ethyl ketone: λ max. 352 nm, $E^{1\%}$=398. A sample is dried at 100° and 0.02 torr and equilibrated with atmospheric moisture. Analysis: Found: $H_2O$, 1.04%, C, 52.02; H, 6.13; N, 16.61; O, 25.24% by difference. For a molecular weight of 1744, this corresponds to an empirical formula of $C_{76}H_{105}N_{21}O_{27}$.

EXAMPLE 10

1.00 g. of the acetone-insoluble powder obtained as described in Example 5 is dissolved as much as possible in 10 ml. of water. The insoluble material is removed by centrifugation, washed with 10 ml. of water and then the supernatants are combined.

1.00 g. of methyl orange is suspended in 15 ml. of water. 5 ml. of dimethylformamide are added and the mixture is warmed until the methyl orange just dissolves. This warm solution is added to the EM-49 solution. The mixture is cooled to room temperature and the solid is isolated by centrifugation, washed with 3 × 35 ml. of water and dried in vacuo.

The crude helianthate is dissolved as much as possible in 3 ml. of dimethylformamide and the insoluble material is removed by centrifugation, washing it with 2 × 3 ml. of dimethylformamide. The combined dimethylformamide solution is combined with 90 ml. of water, the precipitate is separated by centrifugation and this is washed with 3 × 30 ml of water.

The helianthate of EM-49 is amosphous but is purified by reprecipitation from methanol-acetonitrile (2:1). This material is dried at 0.02 mm. and 100° for 18 hours and then allowed to equilibrate with atmospheric moisture. M.P. (Kofler hot stage): 242°-4°C. (dec.). Analysis: Found: C, 53.01; H, 6.74; N, 14.19; S, 5.44 (water 5.05%). For a molecular weight of 2238, the elemental analysis corresponds to an empirical formula $C_{104}H_{144}N_{24}O_{24}S_4$.

The EM-49 helianthate is converted to the hydrochloride by stirring with 10 ml. of 0.36N hydrochloric acid for 20 minutes. The insoluble material is removed by centrifugation and washed with 2 × 5 ml. 0.36 N hydrochloric acid. The combined supernatant is then stirred with 320 mg. of Darco G-60 charcoal and filtered through diatomaceous earth, giving a nearly colorless solution.

The filtrate is extracted with two 10 ml. portions of n-butanol. Removal of the butanol in vacuo gives an amorphous solid. This is converted to a fine powder by dissolving the solid in a small quantity of methanol, adding ethyl acetate until the antibiotic precipitates, and then removing the solvent mixture in vacuo. The powder is then dried at 50° and 0.02 mm. for several (e.g.5) hours and then equilibrated with atmospheric moisture overnight.

EXAMPLE 11

A solution of 500 mg. of EM-49 hydrochloride, obtained as described in Example 10, dissolved in 5 ml. of water is chromatographed on a 2.5 × 60 cm. column of Whatman CM-52 cellulose (carboxymethylcellulose, sodium form) operated at 50°C. and using a flow rate of 75 ml. per hour. The column is eluted with 0.15 N sodium chloride solution collecting 600 drop fractions (approx. 24 ml.). The effluent is monitored by surface tension since the antibiotic reduces surface tension so that constant drop fractions containing the antibiotic have reduced volume. A plot of fraction volume against total elution volume reveals the antibiotic as inverse peaks. The elution is continued (ca. 16 l) until three peaks, designated EM-49 alpha, EM-49 beta and EM-49 gamma, have been eluted. The column is then eluted with 0.20 N sodium chloride (ca. 2.1.) to elute a fourth fraction, as shown by the surface tension peak, designated EM-49 delta.

The fractions containing the respective peaks, EM-49 alpha, beta, gamma and delta, are pooled. Each fraction is extracted with one-half its volume of n-butanol. The butanol extracts are washed twice with equal volumes of 0.36N hydrochloric acid and then evaporated to dryness.

The residues are each dissolved in methanol, precipitated with ethyl acetate, washed with ethyl acetate and ether, dried at 75°C. and 0.02 mm. for one half hour and then equilibrated with atmospheric moisture overnight.

Analysis of each of the foregoing fractions (obtained as the hydrochloride) gives the following:

Analysis (Found) %

| | $H_2O$ | C | H | N | Cl(ionic) |
|---|---|---|---|---|---|
| EM-49 alpha | 5.84 | 42.96 | 8.16 | 13.41 | 11.85 |
| EM-49 beta | 8.91 | 43.49 | 7.85 | 13.68 | 11.06 |
| EM-49 gamma | 8.86 | 43.42 | 6.96 | 12.92 | 10.64 |
| EM-49 delta | 7.09 | 44.75 | 7.17 | 13.13 | 10.58 |

Based on the anhydrous material, the foregoing data provide the following approximate molecular weights and empirical formulas (for the hydrochloride) based thereon:

| | Molecular Weight | Empirical Formula |
|---|---|---|
| EM-49 alpha | 1203 | $C_{46}H_{95}N_{13}Cl_1O_{15}$ |
| EM-49 beta | 1190 | $C_{47}H_{80}N_{13}Cl_1O_{13}$ |
| EM-49 gamma | 1250 | $C_{50}H_{81}N_{13}Cl_1O_{16}$ |
| EM-49 delta | 1267 | $C_{51}H_{86}N_{13}Cl_1O_{15}$ |

Samples of each of EM-49 alpha, beta, gamma and delta are hydrolyzed in 6 N hydrochloric acid at 110°C. overnight. Each hydrolysate is extracted with ether to remove the fatty acid portion. The remaining material is used for amino acid analysis.

Amino acid analyses of the fractions indicate that EM-49 alpha and EM-49 beta differ from EM-49 gamma and EM-49 delta in the amino acid residues present as follows:

Residues per Molecule

| | 2,4-Dab* | Leucine | Phenylalanine |
|---|---|---|---|
| EM-49 alpha | 5 | 3 | 0 |
| EM-49 beta | 5 | 3 | 0 |
| EM-49 gamma | 5 | 2 | 1 |
| EM-49 delta | 5 | 2 | 1 |

* 2,4-diaminobutyric acid

The infrared spectra of each of the foregoing are shown in FIGS. 5, 6, 7 and 8, respectively. Each of the foregoing, like EM-49 hydrochloride is soluble in water, methanol, ethanol, dimethylsulfoxide and acetic acid, and is insoluble in acetone, ethyl acetate, ether and acetonitrile. Each of the foregoing forms salts like EM-49.

Ether extracts of the hydrolysates contain fatty acids that are cleaved from the antibiotic. These are treated with diazomethane to form the methyl esters. The methyl esters are then examined by gas chromatography. The fatty acids from EM-49 alpha differ from the fatty acids from EM-49 beta and the fatty acids from EM-49 gamma and delta differ in the same way.

The EM-49 alpha-beta pair can be differentiated from the gamma-delta pair by a small peak at 696 cm$^{-1}$ in the infrared spectra of the latter pair, which is characteristic of the phenylalanine moiety. Similarly, the UV spectra of the gamma-delta pair has the characteristic absorption of the phenylalanine moiety between 245 and 270 nm and this absorption is lacking in the UV spectra of the alpha-beta pair.

EXAMPLE 12

70 gms. of the acetone-insoluble powder obtained as described in Example 5 is extracted twice between 200 ml. of pH 7.5 water and butanol. The water layers do not have antibiotic activity and are discarded. The butanol layers are combined and extracted four times each with 200 ml. of butanol-saturated water at pH 1.0. The combined water extract has most of the active material that consists of EM-49 and the slow moving fraction (SMF). The water extract is concentrated under vacuo to a syrup and precipitated with acetone. The new acetone powder weighs approximately 15 gms.

EM -49 and the slow moving fraction are first roughly separated by dissolving the 15 gms. of solid in 30 ml. of methanol and passing this solution through a diethylaminoethyl cellulose column (4.5 × 60 cm) in methanol. After most of the dark color comes out of the column, the SMF is eluted with 2% acetic acid in methanol. Approximately 50 ml. fractions are collected, until no more active material comes out of the column, as shown by disc assay against E. coli (SC2927) on agar plates. The fractions are then analyzed by thin layer chromatography on Gelman silicic acid sheets with the solvent system: butanol-isobutyric acid-pyridine-water (40-9-4-10) and bioautography on agar plates seeded with E. coli. The fractions with the SMF (R$_f$=0.15) are combined and concentrated to dryness, approximately 5 grams. This solid is then subjected to partition chromatography on silicic acid-cellulose mixture (2—1 by weight, column size 3 × 60 cm) and using the same solvent system as for the thin layer chromatography. On this column, EM-49 and the SMF are well separated, and are analyzed by the same thin layer chromatography analysis. Again, the desired fractions are combined and taken to dryness, approximately 300 mg. To further purify the compound, the same partition chromatography is repeated. The sample is dissolved in acetone-methanol (1:1) solvent and passed through a Sephadex LH20 column that is soaked and packed in the same solvent. When developed with the same solvent, separate bands can be seen. The SMF now comes out with the solvent front. The fractions are again analyzed by thin layer chromatography and those with a single spot of the SMF are combined and taken to dryness. The final yield is approximately 150 mg. This product is pale yellow in color, is bioautographically pure, no m.p. up to 310°C; starts to change to brown color from 270°C.

A crystalline reineckate salt is made from this sample by dissolving 100 mg. of the final product in 5 ml. of water, dilute hydrochloric acid is added to make the pH 2-3. Then a clear saturated water solution of ammonium reineckate salt is added drop by drop until no more precipitate comes out. This is centrifuged and the precipitate is washed once with 5 ml. of water. The precipitate is then dried and crystallized from acetone-hexane, 50 mg. The crystalline SMF reineckate is a purple powder, insoluble in water by very soluble in acetone and methanol. It does not have a definite m.p. but decomposes at 198°-200°C.(d). The following color tests are obtained: ninhydrin(-), anthrone(-), hydrolysate-ninhydrin(+).

The antibiotic EM-49 SMF shows end absorption in the UV spectrum. The infrared spectrum is shown in FIG. 9. Analysis: Found: C, 50.46%; H, 6.47%; N, 11.69%; neutral equivalent = 584.

For a molecular weight of 1200, the elemental analysis corresponds to an empirical formula $C_{50}H_{76}N_{10}O_{24}$.

A hydrolysate prepared by hydrolyzing 2.012 mg. of the antibiotic in 6N hydrochloric acid at 110°C for 17 hours and analyzed for amino acids shows the followng products to be present in the quantities indicated:

| | | |
|---|---|---|
| 2,4-diaminobutyric acid | 1.74 | $\mu$ moles |
| NH$_4$OH | 1.01 | |
| threonine | trace | |
| serine | 0.84 | |
| glutamic acid | trace | |
| alanine | 0.51 | |
| valine | 0.82 | |
| leucine | 0.45 | |
| tyrosine | trace | |
| phenylalanine | 0.47 | |

The crystalline EM-49 SMF reineckate has a melting point 198°-200°(dec.), in the UV has $$\lambda \text{ max} - 240\text{nm } (E^{1\%}=450)$$

$$\lambda \text{ max} - 315\text{nm } (E^{1\%}=350)$$

is insoluble in water and soluble and acetone and methanol.

EXAMPLE 13

Two fold tube dilution assays with several microorganisms show the following results. The EM-49 used in this study is the hydrochloride and equivalent in purity to the light tan powder described in Example 6.

| Organism | MIC ($\mu$g/ml) |
|---|---|
| Staphylococcus aureus FDA 209P | 4.7 |
| Streptococcus pyogenes C 203 | 0.6 |
| Escherichia coli ATCC 10536 | 0.8 |
| Escherichia coli SC 8294* | 0.6 |
| Pseudomonas aeruginosa SC 8329* | 2.4 |
| Candida albicans SC 5314* | 12.5 |
| Candida crusei SC 2616* | 6.3 |
| Saccharomyces cerevisiae SC 1600 * | 2.4 |
| Aspergillus niger SC 2828 * | 50.0 |
| Fusarium bulbigenum SC 5273 * | 25.0 |
| Trichophyton mentagrophytes SC 2637 * | 6.3 |
| Trichomonas vaginalis SC 8560 * | 37.5 |

* Organisms from the Squibb Culture Collection.

EXAMPLE 14

In vivo testing on mice that had been injected intraperitoneally with 100 LD$_{50}$ doses of Streptococcus pyogenes C203 shows that fifty percent of the mice survive when given a total of 120 mg./kg. of antibiotic EM–49, as the hydrochloride subcataneously in two parts, 1 hour and 5 hours post-infection. No mice survive in the control group not receiving antibiotic.

EXAMPLE 15

Similarly, when mice are injected intraperitoneally with 500 LD$_{50}$ doses of *Escherichia coli* SC 8294 suspended in 5% hog gastric mucin, 50% survive upon subcutaneous injection of 50 mg./kg. of antibiotic EM–49, as the hydrochloride, one hour post infection. None of the mice survive the infection when the antibiotic is not administered.

EXAMPLE 16

Two fold tube dilution assays against the indicated microorganisms show the following results:

| Organism | MIC ($\mu$g/ml) | | | | |
|---|---|---|---|---|---|
|  | alpha | beta | EM-49 gamma | delta | SMF |
| *Staphylococcus aureus* 209P | 12.5 | 6.3 | 3.1 | 2.4 | 75 |
| *Streptococcus pyogenes* C203 | 1.6 | 0.8 | 0.4 | 0.4 | 3.1 |
| *Escherichia coli* SC2927 | 0.6 | 0.6 | 0.6 | 0.4 | 1.6 |
| *Escherichia coli* SC8294 | 0.4 | 0.3 | 0.3 | 0.3 | 12.5 |
| *Pseudomonas aeruginosa* SC8329 | 0.8 | 0.8 | 0.4 | 1.2 | ≥100.0 |
| *Candida albicans* SC5314 | 9.4 | 9.4 | 6.3 | 4.7 | >25.0 |
| *Trichomonas vaginalis* SC 8560 | ≥50.0 | 25.0 | 37.5 | 25.0 |  |

What is claimed is:

1. A process for producing Antibiotic EM–49 which comprises cultivating *Bacillus circulans* ATCC 21656 in an aqueous nutrient medium comprising an assimilable carbohydrate and an assimilable nitrogen source under submerged aerobic conditions until substantial antibiotic activity is imparted to the medium.

2. A process as in claim 1 wherein the microorganism is cultivated at about 25°C.

3. A process as in claim 2 wherein the fermentation is continued for about 60 to 150 hours.

4. An antibiotic selected from the group consisting of Antibiotic EM–49 and acid salts thereof, said Antibiotic EM–49 having the following approximate elemental analysis: C, 56.64%: H, 8.65%; N, 16.50%; having an infrared absorption spectrum as in FIG. 3 and NMR spectrum as in FIG. 4; melting at 245°–248°C; and having an equivalent weight, by titration with perchloric acid, of 272.

5. Antibiotic EM–49 hydrochloride having the following approximate elemental analysis: C, 45.58%; H, 7.31%; N, 14.42%; Cl, 11.86% (ionic); having an infrared absorption spectrum as in FIG. 1 and NMR spectrum as in FIG. 2; melting in the range 180°–207° in vacuo, being soluble in water, methanol, ethanol, dimethylsulfoxide and acetic acid and being insoluble in acetone, ethyl acetate, ether and acetonitrile.

6. An antibiotic selected from the group consisting of Antibiotic EM–49 alpha and acid salts thereof having an infrared absorption spectrum as in FIG. 5; whose hydrochloride has the following approximate elemental analysis: C, 42.96%; H, 8.16%; N, 13.41%; Cl, 11.85% (ionic); having five 2,4-diaminobutyric acid residues, three leucine residues and no phenylalanine residue, being soluble in water, methanol, ethanol, dimethylsulfoxide and acetic acid and being insoluble in acetone, ethyl acetate, ether and acetonitrile.

7. An antibiotic selected from the group consisting of Antibiotic EM–49 beta and salts thereof having an infrared absorption spectrum as in FIG. 6; whose hydrochloride has the following approximate elemental analysis: C, 43.49%; H, 7.85%; N, 13.68%; Cl, 11.06%; having five 2,4-diaminobutyric acid residues, three leucine residues and no phenylalanine residue; being soluble in water, methanol, ethanol, dimethylsulfoxide and acetic acid and being insoluble in acetone, ethyl acetate, ether and acetonitrile.

8. An antibiotic selected from the group consisting of Antibiotic EM–49 gamma and salts thereof having an infrared absorption spectrum as in FIG. 7; whose hydrochloride has the following approximate elemental analysis: C, 43.42%, H, 6.96%; N, 12.92%; Cl, 10.64%; having five 2,4-diaminobutyric acid residues, two leucine residues and one phanylalanine residue, being soluble in water, methanol, ethanol, dimethylsulfoxide and acetic acid and being insoluble in acetone, ethyl acetate, ether and acetonitrile.

9. An antibiotic selected from the group consisting of Antibiotic EM–49 delta and salts thereof having an infrared absorption spectrum as in FIG. 8; whose hydrochloride has the following approximate elemental analysis: C, 44.75%; H, 7.17%, N, 13.13%; Cl, 10.58%; having five 2,4-diaminobutyric acid residues, two leucine residues and one phenylalanine residue; being soluble in water, methanol, ethanol, dimethylsulfoxide and acetic acid and being insoluble in acetone, ethyl acetate, ether and acetonitrile.

10. An antibiotic selected from the group consisting of Antibiotic EM–49 SMF and salts thereof having an infrared absorption spectrum as in FIG. 9; having the following approximate elemental analysis C, 50.46%; H, 6.47%; N, 11.69%; a neutral equivalent =584 and whose reineckate salt has a melting point of about 198°–200°C.

* * * * *